US005120500A

United States Patent [19]

Eggersdorfer et al.

[11] Patent Number: 5,120,500

[45] Date of Patent: Jun. 9, 1992

[54] PROCESS AND DEVICE FOR NONPOLLUTING MASS DEACIDIFICATION OF BOOKS AND OTHER PAPER PRODUCTS

[75] Inventors: Rolf Eggersdorfer, Bad Homburg von der Hohe; Peter Schwerdt; Jurgen Wittekind, both of Frankfurt am Main, all of Fed. Rep. of Germany

[73] Assignee: Battelle-Institue e.V., Frankfurt am Main, Fed. Rep. of Germany

[21] Appl. No.: 475,996

[22] Filed: Feb. 6, 1990

[30] Foreign Application Priority Data

Feb. 11, 1989 [DE] Fed. Rep. of Germany ....... 3904111

[51] Int. Cl.[5] ............ B01J 19/08

[52] U.S. Cl. ............ 422/40; 34/1 R; 34/4; 162/182

[58] Field of Search ............ 422/40; 162/182; 34/4, 34/1

[56] References Cited

U.S. PATENT DOCUMENTS

| | | | |
|---|---|---|---|
| 2,949,677 | 8/1960 | Cameron | 43/1 |
| 3,676,182 | 7/1972 | Smith | 117/60 |
| 4,051,276 | 9/1977 | Williams et al. | 427/248 |
| 4,103,431 | 8/1978 | Levinson | 34/4 |

FOREIGN PATENT DOCUMENTS

| | | | |
|---|---|---|---|
| 911110 | 8/1967 | Canada | 8/96 |
| 0273902 | 7/1988 | European Pat. Off. . | |
| 1143947 | 2/1963 | Fed. Rep. of Germany . | |
| 1132267 | 6/1968 | Fed. Rep. of Germany . | |
| 2107353 | 8/1972 | Fed. Rep. of Germany . | |
| 2550226 | 5/1977 | Fed. Rep. of Germany . | |
| 3341585 | 5/1985 | Fed. Rep. of Germany . | |
| 3445064 | 6/1986 | Fed. Rep. of Germany . | |
| 3738992 | 4/1988 | Fed. Rep. of Germany . | |

OTHER PUBLICATIONS

*Mass Deacidification for Libraries*, Library Technology Reports, May-Jun. 1987, vol. 23, No. 3, pp. 410-440—Cunha.

CA 88(2):8769v, "Design of a liquid gas mass deacidification system for paper and books," Richard Smith, 1977.

*Primary Examiner*—Timothy M. McMahon

*Attorney, Agent, or Firm*—Quarles & Brady

[57] ABSTRACT

Process and device for the nonpolluting mass deacidification of books and other printing and paper products with the predrying of these products by high-frequency radiation in a vacuum, then the application of a neutralization treatment with solutions for deacidification and the subsequent drying of solvents used also by high-frequency radiation in a vacuum. Preferably a single treatment chamber (1) for predrying, neutralizing and drying is used. The interior space of the treatment chamber can be exposed to high-frequency/microwave radiation of a generator (2), to which devices (4, 8, 9; 10 to 19 and 5) combined into a closed movable unit with chamber (1) are connected for the supply and removal of the solutions, for the evacuating of air and for the environmentally favorable separation of vapors when drying the accumulated exhaust air. The process and the device make possible a quick and efficient, as well as nonpolluting, mass deacidification with nearly complete recovery of the solvents.

10 Claims, 2 Drawing Sheets

PROCESS AND DEVICE FOR NONPOLLUTING MASS DEACIDIFICATION OF BOOKS AND OTHER PAPER PRODUCTS

BACKGROUND OF THE INVENTION

1. Field of the Invention

The invention relates to a process for nonpolluting mass deacidification of all types of books and other printing and paper products, such as, magazines, records, etc., as well as to a device for performing these processes.

2. Background Art

The aging occurring in all printing and paper products and also especially in books during storing leads above all to a progressive deterioration of the paper substances by traces of acids released in the paper. If no countermeasures are taken, after some decades, this deterioration results in a complete disintegration of the papers.

Therefore, to preserve archives and library holdings of several hundred million books worldwide, it is necessary to neutralize the acids in paper and to simultaneously incorporate in the paper a sufficient amount of a substance that also neutralizes a future acid release in the paper.

In view of the very large amounts of books involved, only those processes are suitable for this purpose that permit treatment of the whole books, i.e., processes in which it is not necessary to open the bookbinding and to treat the pages individually. The same also applies to all kinds of archival holdings to be preserved, which also require the treatment of bound or otherwise assembled paper pages.

A known process consists in the treatment of books with vapors from metal alkyls, especially with vapors from diethylzinc. Due to the moisture in the paper, the metal alkyls are converted into the oxides of the metals, e.g., into zinc oxide, that remains in the paper, and is a good neutralizing agent for free acids. The metal alkyls suitable for this purpose, however, are materials which self-ignite in air and which in handling represent a constant potential risk of fire and explosion and, therefore, require extreme care.

Corresponding to a further known process, after previously being dried, the books are treated with a solution of a magnesium organic compound, such as, methylmagnesium carbonate in a suitable solvent. Also, in this case, the magnesium compound is converted by moisture in the paper into magnesium oxide and magnesium carbonate, both of which are able to neutralize the acids. Alcohols, e.g., methanol, in mixture with chlorofluoro-hydrocarbons, such as, trichlorotrifluoroethane are especially suitable as solvents.

Besides the advantage of incombustibility and nontoxicity, fluoro- and fluorochloro-hydrocarbons also offer the advantage of good compatibility with most book materials, such as, paper, cardboard, printing inks, glue and other adhesive agents, and are therefore especially well suited for this purpose.

Besides the high price, it is a special drawback that the named materials when they leak into the atmosphere, constitute considerable pollution and are a threat to the environment. Therefore, relevant laws for the handling of these materials require their substantial recovery and a very substantial purification of the exhaust air that is discharged from the treatment units.

Also, in the case of the treatment of books and other printed products, it follows from the above that after their treatment they have to be dried carefully so that they contain practically no solvent, and that the solvent-containing exhaust air from the drying process has to be purified except for very small residual contents of the solvents used.

While the drying of solvent-containing bulk goods normally causes no problems, the drying of compact, bound paper thus far has required very long drying periods. It is known, in fact, that the drying of books can be effectively supported by lowering the ambient pressure, but the reduced pressure simultaneously impedes the supply of the heat required for solvent evaporation.

It is further known, with drying under reduced pressure, i.e., vacuum drying, to introduce the evaporation heat to the substance to be dried by heat radiation. In books, this process, however, is applicable only with very small heat output since otherwise the books and especially the book-gluing are damaged.

BROAD DESCRIPTION OF THE INVENTION

An object of the invention is to provide a process for the nonpolluting mass deacidification of books and other paper products using a neutralization treatment with solutions for the deacidification and the subsequent drying of the solvents, that permits simultaneously in an environmentally favorable way a quick and, thus, efficient treatment for mass deacidification of books and other paper products. Another object of the invention is to provide a device for performing the process according to the invention. The objects of the invention are achieved by the process and device of the invention.

The process of the invention involves a process for the nonpolluting mass deacidification of books and other paper products using a neutralization treatment with solutions for the deacidification and the subsequent drying of the solvents. The process includes a predrying the books or other paper products and then a drying after their deacidification where each such operation is performed when heating with high-frequency radiation under normal pressure or in a vacuum.

The invention device for performing the invention includes a single treatment chamber (1) whose interior space can be exposed to the radiation of a generator (2) for high-frequency radiation and to which are connected devices (4, 8, 9; 10 to 19) combined with the treatment chamber in a unit for the supply and removal of the solutions, for evacuation of air (5) and for removal of the vapors of the exhaust air accumulating during drying.

It was shown in a surprising way that the solvents suitable for the treatment of books, such as, alcohols, fluorohydrocarbons and chlorofluorohydrocarbons, are accessible to high-frequency heating. The possibility of dehydration by the high-frequency heating of the material to be dried has been considered only in other fields using such drying technique. As is known, water because of its physical and chemical material data is extraordinarily well suited for heating by high-frequency radiation or microwave radiation and can be evaporated in this way.

However, the fact of successful use of high-frequency treatment in the above-mentioned and other suitable solvents is not only new and surprising but also provides decisive advantages. Thus, in comparison tests it was possible to reduce the time required for predrying, in comparison to the use of a light heating in a vacuum harmless to the books, by a factor of more than 50. Also, in drying the solvent a considerable saving of time was achieved in which the solvent, in contrast to conventional long-term storage under normal pressure or reduced pressure, could practically completely be removed.

The speed of the course of the process according to the invention is extraordinarily important. It is not only advantageous, but in the long run makes possible the treatment of large amounts of books, as required in the future, on a large scale. Because the treatment only slightly heats the treated printing and paper products, the effective drying is extraordinarily gentle. Because of the practically complete removal and recovery of the solvent from the treated paper that can be achieved in a practical amount of time, the solvents mentioned which are suitable but environmentally polluting can also be used.

Moreover, the speed of the process offers the advantage that the predrying, the neutralization treatment and also the drying can be performed in a single chamber—time-consuming drying processes in special dryers are superfluous. Such a chamber also offers the advantage of a closed system with the optimal possibility for the complete detection and controlled processing of the amounts of exhaust air. Moreover, expensive solvents can be recovered by environmentally favorable separation in which all of the amounts of air loaded with solvent that accumulate in the process are covered.

By the combination of the actual treatment unit with the exhaust air purification unit and the storage tanks for the treatment solution, it is possible to make a compact, transportable device which can be brought, for example, to the respective libraries and archives. Since completely closed systems are possible, operation by the library personnel is possible with the corresponding automatic control of the process steps. The action with high-frequency or microwave radiation requires no high technical experience and no great expense. For the predrying and final drying, the same high-frequency or microwave radiation can be used. Thus, a two-chamber system can easily be made, which has a separately provided predrying chamber, with the advantages of simultaneous predrying and treatment of amounts of books and a high throughput.

The process according to the invention and the device for carrying it out are explained below in more detail.

DETAILED DESCRIPTION OF THE INVENTION

Figure 1:
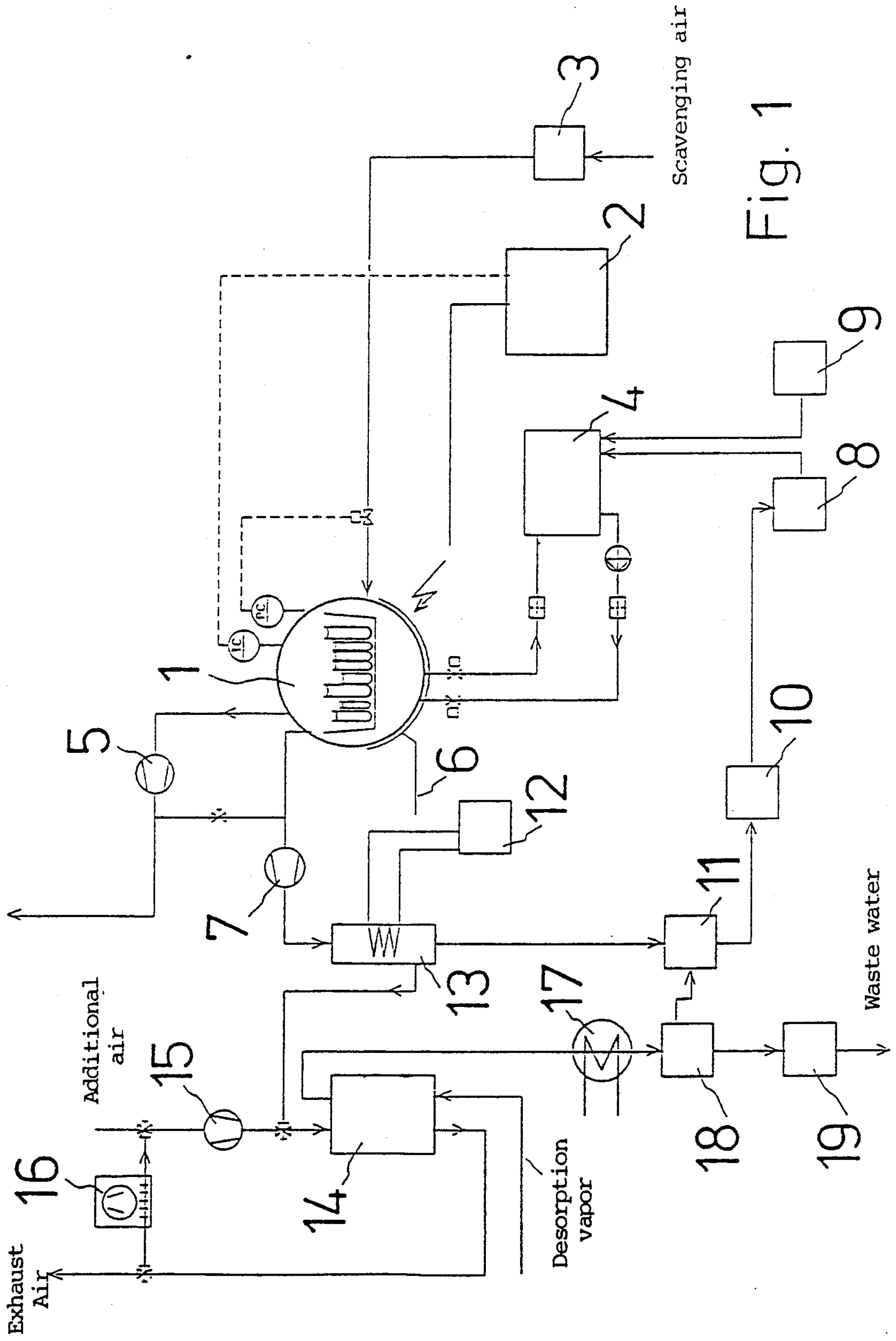
FIG. 1 is a schematic of a first preferred embodiment of the device according to the invention.

As the main component, the device in FIG. 1 exhibits a single chamber 1 both for predrying and for treatment with solutions and final afterdrying. For this purpose, treatment chamber 1 is provided with a high-frequency or microwave generator 2, with which the interior of the chamber can be exposed, e.g., to a high-frequency-radiation of, e.g., 27.12 MHz or a microwave radiation of, e.g., 2450 MHz, as diagrammatically indicated. The means of producing microwave radiation or high-frequency radiation in such cylindrical hollow spaces, e.g., as in the case represented, are known sufficiently from other technical fields. In the embodiment, a microwave chamber having a 2450 MHz radiation frequency was used.

Chamber 1 is connected by a valve to an air dryer 3, by which dried scavenging air can be fed to the chamber. Further, chamber 1 is connected by valves and purification filters, each of which are provided in inflow and outflow pipes, to a storage tank 4 for treatment solutions. In the inflow pipe, a feed pump is provided ahead of the filter.

Further, chamber 1 is connected to a vacuum pump 5, in which the chamber pressure is measurable and controllable by a pressure sensor PC (pipe, shown as broken line, to the scavenging air valve). Also, the temperature is controllable in the chamber, in which for this purpose a temperature sensor TC is provided with the corresponding feedback to generator 2. The temperature of the outside wall of the chamber can be adjusted by an electric, direct or indirect, jacket heater indicated at 6 so that water vapor condensation on the chamber wall is avoided and the microwave drying is accelerated.

A compressor 7, connected by a valve to vacuum pump 5, is connected to chamber 1 and constitutes the connection to the processing and recovery devices for the solvents. A solvent tank 8 also is connected to these devices by a corresponding recovery pipe. Tank 8 and a storage tank 9 for the effective neutralizing agent to be used—in the present case, methylmagnesium carbonate—have feed pipes to storage tank 4.

Solvent tank 8 is supplied by a device 10 to process the solvent by drying and neutralizing, which in turn is connected to a solvent collecting tank 11. Solvent collecting tank 11 is connected to condenser 13, which is connected to a refrigerator 12, and to which the exhaust air accumulating at the after drying is fed through compressor 7. Condenser 13 is connected by a valve to a device 14 for adsorbent exhaust air purification. This valve is further connected to a fan 15, that forms an adsorption processing circuit with device 14, and with an air cooler 16 connected to the above and to the fan. Device 14 is fed desorption vapor for adsorbent exhaust air purification, and depending on the position of the valve for condenser 13 and fan 15, either the exhaust air from the compressor or for the dilution of the additional air of the exhaust air is fed by the fan. For dilution, a valve for the feeding of additional air is connected between air cooler 16 and fan 15. Further, an exhaust air valve for purified exhaust air is provided in front of the air cooler.

Device 14 for adsorbent exhaust air purification further feeds regenerated solvent to solvent collecting tank 11 by an additional condenser 17 and a device 18 for water/desorbate phase separation, connected to a device 19 for water processing.

The one-chamber process for nonpolluting mass deacidification of books, performed with the device according to FIG. 1, proceeds as follows. For treatment, the books are placed with the spines down in baskets of suitable material, for example, polyethylene or polypropylene. By inserting spacers, a fanwise spreading of the books can be achieved, and a floating can be avoided as well.

Then predrying takes place in vacuum- and pressure-proof chamber 1. For this purpose, the chamber is evacuated of air to a pressure usually lower than 100 mbars with vacuum pump 5. Simultaneously, the books are heated to a maximum of 60° C. in the microwave field, and the heated pressure- and temperature controls are applied. A smaller airstream guided through the chamber from air dryer 3 and a simultaneous jacket heating (6) of the chamber avoid water vapor condensation on the chamber wall and accelerate the drying. The vacuum exhaust air is guided in this predrying phase by a pump 5.

As soon as the drying has reached the desired residual moisture content, vacuum pump 5 is turned off, and treatment chamber 1 is flooded with neutralizing solution. In this way, excess pressure is produced in the chamber with the feed pump in the supply pipe of storage tank 4 to improve the impregnation of the paper. If necessary, a pressure pulsation and/or an acoustic irradiation with suitable frequencies can be applied for an even better impregnation.

Following the necessary exposure time, the solution is fed back into storage tank 4, and the fine filter provided retains mud particles and rinsed magnesium oxide. Then, microwave generator 2 is again turned on and the drying of the solvent is started.

The solvent vapors developing during the heating of the books are first suctioned off with cold compressor 7 and toward the end of the drying phase with pump 5 switched on by the valve, compressed and cooled in condenser 13. A considerable part of the solvent vapors thus suctioned off condenses in this way and is fed to solvent collecting tank 11.

The more extensive separation of the solvent vapors to the legally specified limits takes place in the adsorbent exhaust air purification in the circuit consisting of devices 14, 15 and 16. By bringing in additional air in this circuit by fan 15, the temperature of the adsorbent can be adjusted.

After reaching the maximum solvent loading, the solvent adsorption in 14 is regenerated according to the state-of-the-art by means of steam, air or an inert gas, optionally with vacuum support. After condensing and phase separation (17, 18), the recovered solvent is neutralized and dried in device 10 from collecting tank 11, to which the solvent separated in condenser 13 had been fed, and then is fed into solvent tank 8.

After separation of the methanol also used, the water condensate in water processing device 19 is either again used for regeneration or fed into the waste water.

To adhere strictly to the emission limits in addition to the solvent load from the dryer, all additional exhaust airs, i.e., the chamber exhaust air during filling and emptying as well as the exhaust air from the storage tanks and from the water processing, are also fed to the device for exhaust air purification.

Figure 2:
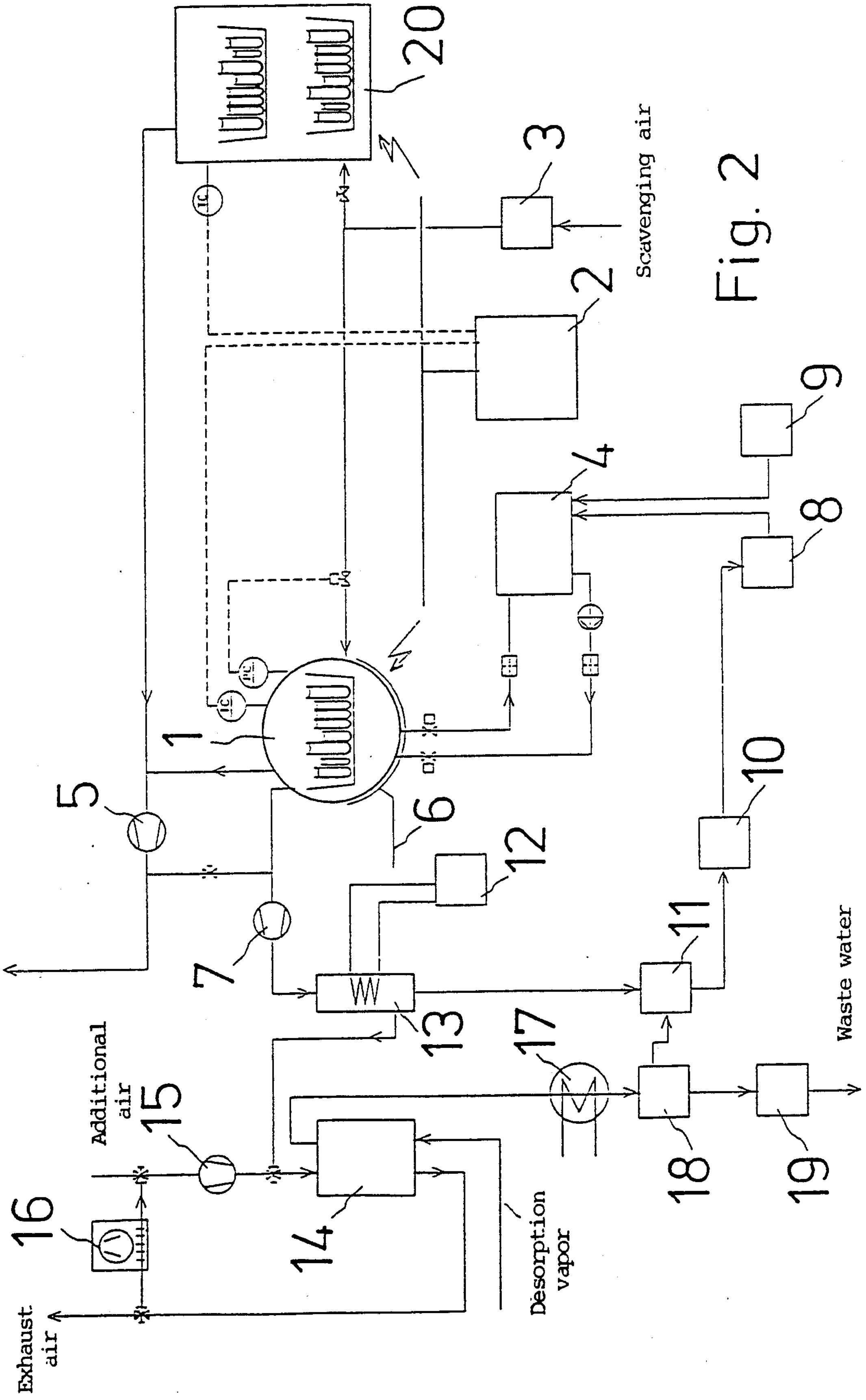
FIG. 2 is a schematic of a second, modified preferred embodiment of the device according to the invention.

In FIG. 2, the sketched device agrees with the device from FIG. 1 except for the design of an additional drying chamber 20. Regarding chamber 20 a valve is connected to air dryer 3 and by means of generator 2, chamber 20 is exposed to microwave radiation or high-frequency radiation. The process also corresponds to what has been explained above, and a higher throughput performance is possible, since while a book load is being predried, an already predried load can be neutralized simultaneously. The process also is completely closed, since the exhaust air processing in chamber 1 takes place as in the example explained without some emission from solvents in the environment. Besides the sketched two-chamber process, one can also for example use two treatment chambers and a predrying chamber since the predrying is feasible, in general, in shorter periods than the afterdrying.

The following test results were achieved by application of the explained process. Books with storage moisture of 8 to 10 percent were predried in only 30 minutes to 2 percent residual moisture at a pressure of 50 mbars, a high-frequency output of 500 watt and a radiation frequency of 2450 MHz. In contrast, for a vacuum drying without this high-frequency heating, 30 to 40 hours are necessary for a residual moisture of 1 to 2 percent.

An afterdrying of books, which after the neutralization treatment contained 100 to 120 percent of their dry weight in solvent trichlorotrifluoroethane, with the same high-frequency radiation and 280 watt high-frequency performance, yielded after 15 minutes solvent-free books, whose temperature at the end of the drying was about 60° C.

However, in the case of drying by storing in air at about 20° C., without in this case achieving as complete a release of solvent, drying times of 24 to 30 hours are necessary, and the damage to the environment caused by the emission of residual solvents from the books must be accepted. Also, vacuum drying with an end pressure of 1 mbar and a temperature of 50° C. by conventional heating required 2 to 5 hours.

What is claimed is:

1. A process for deacidification of at least one book or other paper product comprising the steps of:

a) predrying of the at least one book or other paper product to reduce the water content to a predetermined level by use of a vacuum;

b) deacidifying the at least one book or other paper product using a solvent solution; and c) drying the at least one book or other paper product to reduce the solvent content to a predetermined level by use of vacuum, wherein microwave radiation is used along with the vacuum of either or both steps of a) and c) to aid in drying.

2. Process for nonpolluting mass deacidification of at least on book and other paper product using a neutralization treatment with a solution for deacidification and subsequent drying of the organic solvent or solvents suitable for the treatment of the books and other paper products, characterized in that a predrying of the at least one book or other paper product for substantially removing the moisture content and the drying of the organic solvent or solvents after the neutralization treatment of the at least on book or other paper product are each performed in a vacuum with heating using microwave radiation.

3. Process according to claim 2 wherein a solution of a magnesium organic compound in methanol, ethanol, fluorohydrocarbon, chlorofluorohydrocarbon, benzene or of mixtures of these materials is used, and wherein the predrying, deacidification and drying are performed in a treatment chamber.

4. Process according to claim 3 wherein the vapor of the solvent or solvents is removed from the exhaust air accumulating during the drying by condensation, adsorption, absorption or any combination thereof.

5. Process according to claim 4 wherein the predrying is performed in a separate chamber.

6. Process according to claim 5 wherein microwave radiation of a frequency of, e.g., 2450 MHz is applied for the heating.

7. Process according to claim 2 wherein the vapor of the solvent or solvents is removed from the exhaust air accumulating during the drying by means of condensation, adsorption, absorption or any combination thereof.

8. Process according to claim 2 wherein the predrying is performed in a separate chamber.

9. Process according to claim 2 wherein microwave radiation of a frequency of, e.g., 2450 MHz is applied for the heating.

10. Process according to claims 7 or 6 wherein the same generator for microwave radiation is used for said separate chamber and said treatment chamber.

* * * * *